Nov. 25, 1958 G. G. HASELDEN 2,861,432
EXTRACTION OF OXYGEN FROM THE ATMOSPHERE
AND LIKE OPERATIONS
Filed Nov. 10, 1954 3 Sheets-Sheet 1
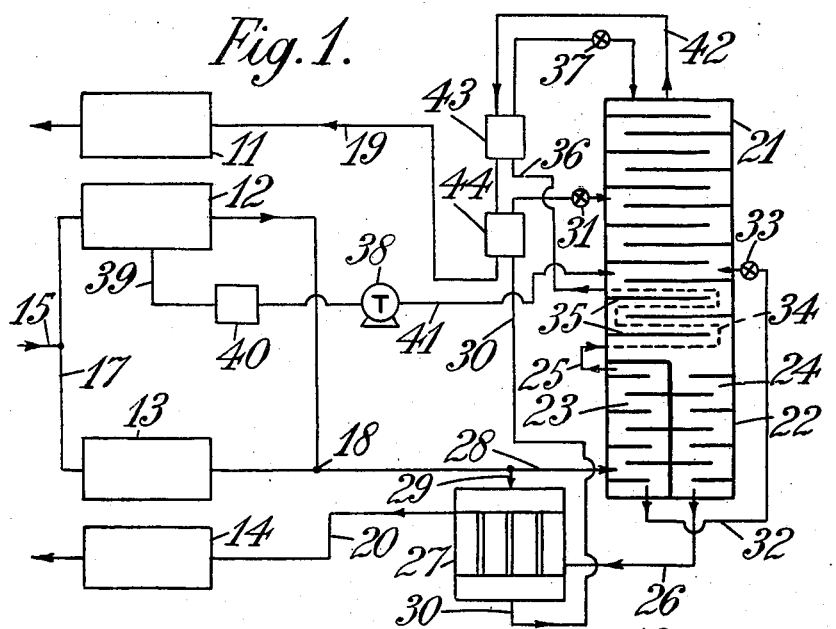
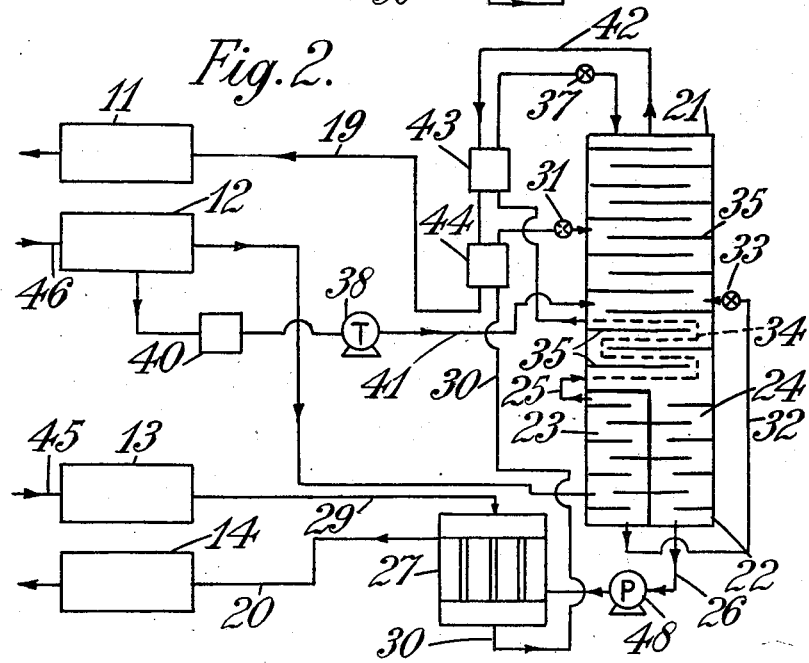
INVENTOR
Geoffrey G. Haselden
By Watson, Cole, Grindle &
Watson ATTORNEYS

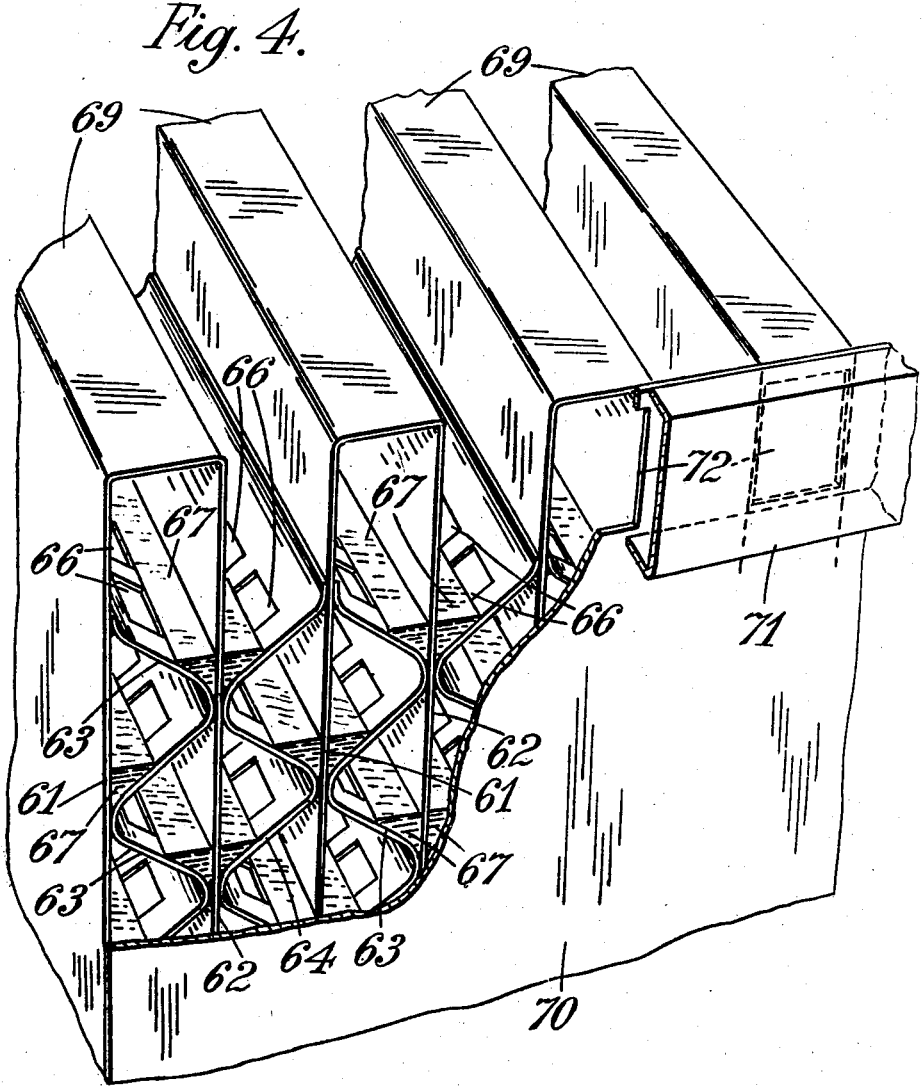

United States Patent Office 2,861,432

Patented Nov. 25, 1958

2,861,432

EXTRACTION OF OXYGEN FROM THE ATMOSPHERE AND LIKE OPERATIONS

Geoffrey Gordon Haselden, Morden, England

Application November 10, 1954, Serial No. 468,110

Claims priority, application Great Britain November 12, 1953

23 Claims. (Cl. 62—29)

This invention comprises improvements in or relating to the extraction of oxygen from the atmosphere and like operations.

Oxygen for commercial use is usually separated from the atmosphere by a process involving liquefaction of the air, and fractional distillation so that the oxygen and nitrogen constituents are separated from one another. In the well-known double-column apparatus, air under pressure is fed into a lower column in which it is liquefied, a mixture of liquid oxygen and nitrogen is collected in the sump of the column and substantially pure nitrogen near the top. The liquid mixture of oxygen and nitrogen from the sump is led through an expansion valve into an upper column at a point part of the way up the column, and the substantially pure liquid nitrogen from the upper part of the lower column is led into the top of the upper column, to serve as reflux liquid. Nitrogen vapour in a substantially pure state is then obtained from the top of the upper column, and oxygen in liquid or gaseous form, and in a substantially pure state from the bottom of the upper column. This process involves compressing all the air to a pressure of about five atmospheres, and the power required is considerable. Indeed, about half the cost of the recovered oxygen is represented by the cost of compression. It is an object of the present invention to provide a process in which the power consumption is reduced.

There is another process of separation of oxygen from the atmosphere wherein cooled air under pressure is liquefied by heat-interchange with previously liquefied products of the process, the liquefied air is expanded into the top of a reflux column, and the liquid so expanded into said column is used first to wash nitrogenous gases led thereinto and derived from the heat-interchange operation and thereafter to supply the liquid for said heat-interchange operation, whereby it loses nitrogen and becomes substantially an oxygen product. This process, sometimes described as the single-column process, is not normally employed because the outgoing nitrogenous gases carry away with them too much oxygen, so that too much air has to be compressed to obtain a given quantity of oxygen. The usual process is therefore the double-column process referred to above.

According to the present invention however, in a process of the single-column type, the cooled pressure-air is divided into three portions, one of which is only partially liquefied in the said heat-interchange operation, leaving a nitrogen or mainly-nitrogen gaseous pressure-product which is liquefied by further heat-interchange in the column and used as reflux at the top of the column, the second portion of the air is liquefied by heat-interchange with the outgoing liquid oxygen and is used as reflux at an intermediate level in the column whilst the remaining portion is expanded through a turbine to provide refrigeration for the process and also admitted to the column. This leads to a column design of exceptional thermodynamic efficiency and reduced power consumption. The heat-interchange device used for the above mentioned first portion of the pressure air is to be separated, includes fractionating features and may be termed a condenser-evaporator in the heat-interchange operations as hereinafter described.

The initial cooling of the compressed air in a plant of this description, is normally effected by regenerators in which the incoming air is cooled by regenerator-bodies which have previously themselves been cooled by the outgoing cold or liquefied gases, which latter are thereby raised to atmospheric temperature before they leave the plant.

In one form of the process according to this invention one pair of the regenerators is allocated to the outgoing oxygen, the other to nitrogen and the air cooled in the former is compressed to a higher pressure than that in the latter and used in heat-interchange with the outgoing oxygen to produce additional liquid air for reflux purposes. This permits a lower pressure to be used for the air which produces a nitrogen fraction in the main heat-interchange operation.

The following is a description by way of example of plant in accordance with the invention and of the process as carried out therein:

In the accompanying drawings,

Figure 1 is a diagrammatic representation of one form of plant in accordance with the invention;

Figure 2 is a similar view of a second form;

Figure 4 is a perspective view of a particular form of fractionating condenser-evaporator which can be used for the purposes of the processes according to the present invention.

Figure 3:
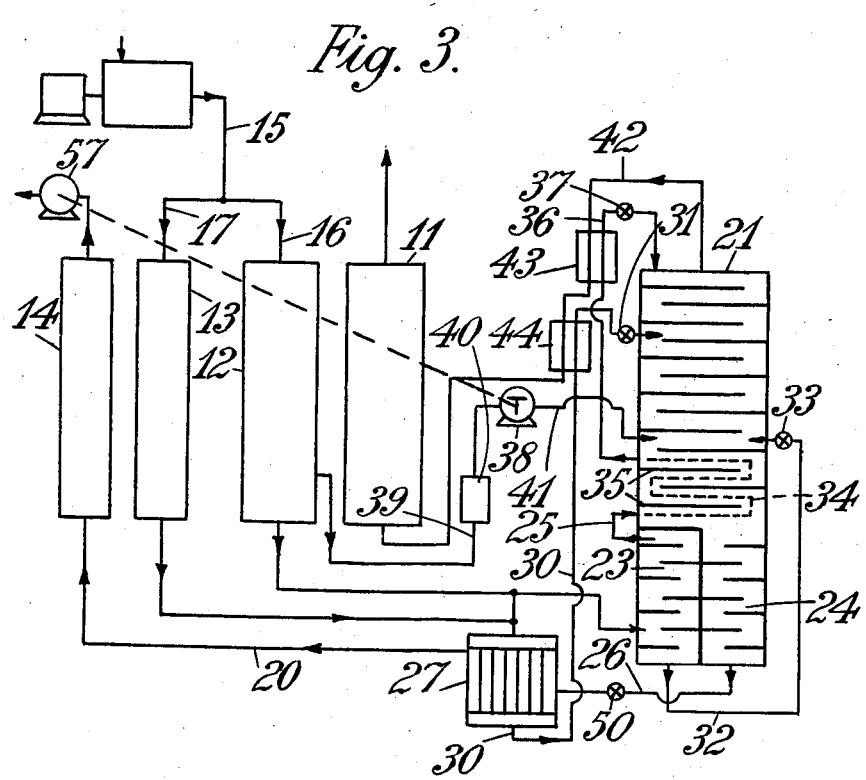
Figure 3 is a similar diagram of a third form.

In Figure 1 there are shown two pairs 11, 12 and 13, 14 of regenerator-chambers for preliminary cooling of ingoing air. Ingoing air 15 is divided into two streams 16, 17 which pass through one each of the pairs of regenerator-chambers and are united at 18 after having passed therethrough. The regenerator-chambers are cooled by outgoing gases 19, 20 in known manner and of course the usual change-over devices for directing the air streams are provided. The ingoing air 15 is pumped to a lower pressure than is usual with the double-column process, namely only to about four atmospheres above atmospheric pressure (five atmospheres absolute). A fractionating-column 21 is provided which comprises at the bottom a heat-interchanger or fractionating condenser-evaporator 22, preferably constructed as hereinafter described with reference to Figure 4, and divided essentially into two sections 23, 24, the first 23 for fractionating ingoing air with the aid of cooling derived by heat transfer to the second section 24, which also is constructed to facilitate fractionation. About 45% of the ingoing air, which has been cooled to a temperature of about minus 280° Fahrenheit in the regenerators, is led into the bottom of the heat-interchanger chamber 23 through pipe 28, and works its way up to an outlet 25 at the top. In the fractionating-column 21, liquefied gases descend and just above the heat-interchanger, sections 23, 24, consist mainly of liquid oxygen, mixed however, with some nitrogen. As this liquid passes down through the section 24 of the heat-interchanger 22, it cools the ingoing air in section 23 and partially liquefies it. The liquid fraction runs down and a mixture of liquefied oxygen and nitrogen containing about 45% oxygen collects in the bottom of the heat-interchanger-chamber 23. The gas which passes out of the chamber at the top at 25 without being liquefied consists almost entirely of nitrogen and represents say 25% of the ingoing air. The liquid which is passing down through the section 24 of the heat-interchanger receives heat from the air in section 23 and partially evaporates under fractionating conditions such that the generated vapour, as it rises through the heat-interchanger section is kept in near equilibrium with the descending liquid. Thus nearly pure liquid oxygen collects at the bottom of the fractionating column in section 24 and the vapour leaving the top of this section approaches closely the concentration of vapour in equilibrium with the entering liquid from the column. By this means the variation of the condensing-temperature of the vapour rising in section 23 of the fractionating condenser-evaporator is approximately matched by variation of boiling point of the liquid descending section 24 of the same, and the temperature difference necessary for heat transfer between them remains small and approximately constant. The oxygen collecting at the bottom of section 24 is the product of the process. It is passed out by pipe 26 through another heat-interchanger 27 where it exchanges heat with a second stream 29 of the ingoing air from the regenerators. This air represents about 20% of the total ingoing air and is, it will be remembered, under a pressure of about five atmospheres absolute, whereas the outgoing liquid oxygen is only slightly above atmospheric pressure. The liquid oxygen is vaporised and the air is condensed in this heat-interchanger 27, which may be described as a co-current condenser. The oxygen vapour produced goes out at 20 through one of the regenerator elements, where it is brought up to atmospheric temperature. The liquid air 30 from the co-current condenser 27 is expanded through a valve 31 into the fractionating-column 21 part of the way towards the top thereof, and forms parts of the descending liquid in the column, which is at a pressure but little above atmospheric.

The oxygen-rich liquid 32 from the first described heat-interchanger is also expanded through valve 33 into the column, but, on account of its being richer in oxygen, at an appropriately lower level. The nitrogen vapour from the heat-interchanger section 23 is led from inlet 25 through pipes 34 inside the column 21 above the heat-interchanger section 23, 24. These pipes 34 are distributed on shelves 35 inside the column over which the descending liquid trickles, and the nitrogen vapour in pipes 34, in the course of passing through the tubes on the shelves, becomes liquefied. Thence it passes through pipe 36 and an expansion valve 37 into the top of the column to act as reflux liquid.

Part of the air passing the regenerators 11 to 14 is passed into an expansion turbine 38 where it does useful work, and is cooled to a temperature below minus 300° Fahrenheit. One way (known in itself) of doing this is to provide one pair of the regenerator elements with a tapping 39 part of the way along its length from which about 35% of the air is drawn off at a temperature not so cold as that of the main outlet from the regenerator, namely at about minus 240° Fahrenheit and is then passed through a $CO_2$ extractor 40 before entering the turbine. This cold air 41 is then led into the fractionating-column 21 at a level above the trays 35 which carry the nitrogen condensation tubes. The result of the various deliveries of cold liquids to the upper part of the fractionating-column is that there is a continuous descent through it of reflux liquid which becomes less cold as it goes down so that nitrogen is evaporated from it. Nearly pure gaseous nitrogen 42 is led out at the top of the column at a temperature little above its liquefaction point, and is passed out at 19 through the regenerator system so as to bring it up to atmospheric temperature. On its way to the regenerator system it may pass through heat-interchangers 43, 44 where it helps to cool further the liquid air 30 from the co-current condenser 27 and the liquid nitrogen 36 from the tubes carried by the trays 35 in the fractionating-column 21.

One advantage of the process described lies in the fact that the air need only be compressed to about 70 lbs. per square inch absolute in contract to about 85 lbs. with the double-column process.

In a modified apparatus diagrammatically shown in Figure 2, there may be a further saving of power. In this diagram many of the features are the same as in Figure 1 and are similarly numbered, but the air 45 passing through the regenerators 13 or 14, which is cooled by the outgoing oxygen 20, is compressed separately to about 70 lbs. per square inch absolute. This air represents about 20% only of the total and is delivered direct to the co-current condenser 27. The remainder of the air 46, which goes through the nitrogen-cooled regenerator is compressed only to about 60 lbs. per square inch absolute, and is used as to half of it in the turbine 38 and the other half 47 in the heat-interchanger section 23 at the bottom of the fractionating-column. The 80% of the air which is compressed only to 60 lbs. per square inch requires less power than the corresponding air in Figure 1.

In either process as described above, the oxygen can, if desired, be delivered under pressure from the regenerator, or from a heat-exchanger used in place of it, under pressure. This is also shown in Figure 2. Normally, the delivery of oxygen as a product under pressure from a plant of this description offers difficulties, but in the plant as above described, it can be compressed by a pump 48 in the liquid form before it enters the co-current condenser 27, and maintained under pressure as it passes through the regenerator 13 or 14. In this case the input air 29 going to the co-current condenser 27 must be raised in pressure to a value sufficient to bring its condensation temperature above the boiling point of the product oxygen. This plan offers a useful source of oxygen under pressure for use in, say, a steel works.

In another alternative form of the process shown in Figure 3, the nearly pure liquid oxygen 26 passing from the base of the column 21 to the co-current condenser 27 may be passed through a valve 50 to expand it to a slightly lower pressure. For instance if the base of the column is functioning at a pressure of 1.35 atmospheres absolute the liquid may be expanded down to 1.1 atmospheres absolute. To maintain this lower pressure it may be necessary to use a booster 57 on the oxygen product outlet from the regenerator 13 or 14 to enable the product oxygen to overcome the flow resistance of the regenerator, which booster could be at least partly driven by the expansion turbine 38. A lower evaporating pressure of the liquid oxygen in the co-current condenser is thus obtained and it may no longer be necessary to compress the portion of the inlet air going to this condenser to a pressure in excess of that required by the inlet air 41 going to the base of the column 21, and the plant will therefore function with all the inlet air at a pressure of about 4 atmospheres absolute.

In a further modification of the plant, there may be three pairs of regenerators, two of them cooled by outgoing nitrogen and one by oxygen. In this case the turbine air is derived from one of the nitrogen regenerators and the air for the heat-interchanger in the base of the fractionating-column from the other nitrogen regenerator. This results in a further saving of power, because the turbine air need only be compressed to 40 lbs. per square inch absolute, and in a large plant the fact that two or three separate air delivery pressures are required, may be outweighed by the saving in power.

Referring now to Figure 4, this shows a form of heat-interchanger suitable for use in connection with the process above described, Figures 1, 2 or 3, because it allows heat-interchange accompanied by fractional separation on both sides of the heat transfer.

In this apparatus vertical partitions 61—62 are separated by horizontally corrugated spacers 63, 64. The spacers are united, for example by solder, to the vertical partitions where they touch them and each bend in each spacer is perforated in its upper part with a row of holes 66 extending parallel to the corrugation which it forms. The effect is to form horizontal pockets 67 below each row of perforations, in the angle between the spacers 63 or 64 and its corresponding vertical plate 61 or 62, as the case may be, where liquid can collect and whence, overflowing, it can creep through the perforations and run as a thin film down the underside of the corrugation. These thin films, being exposed to upgoing currents of gases, are effectively fractionated.

The upper ends of the alternate spaces which surround the spacers 63 are closed over as shown at 69 and the ends of the spaces are closed in by sheet metal, as shown (partly broken away) at 70. A manifold 71 on the plate 70 is connected to the spacers containing spacers 63 by ports 72 and collects nitrogen from the upper ends of the spacers. A similar manifold at the bottom delivers air thereto.

The intermediate spaces, which surround the corrugated spacers 64, are open at the top and connected at the bottom to another manifold. The rest of the column 21 is built up above the unit shown in Figure 4. As will be clear, gases and liquid descending from column 21 enter the spaces which are open at the top and they absorb heat from the air in the spaces below the closed in tops 69. Fractionation proceeds in both sets of spaces. The spaces below the closures 69 correspond to the section 23 of Figures 1, 2 and 3 and the open spaces containing the corrugated members 64 correspond to the section 24. This arrangement is both compact and efficient.

I claim:

1. A process of separation of gases by low temperature rectification, wherein the cooled pressure-gas to be separated is divided into three portions, one of said portions and a cold portion at a lower pressure which has been previously partially fractionated and enriched in the constituent of higher liquefaction point are subjected to initial fractionation and further fractionation respectively alongside one another in the same column but are kept out of contact with one another by upstanding internal column-partitioning means, heat transfer taking place between the two through said partitioning means while they are undergoing said fractionations, the liquid enriched in the constituent of higher liquefaction point and the purified liquid fraction of the same constituent, obtained respectively as a result of said initial and further fractionations, collect in the bottom of the column at the same level on opposite sides of said upstanding partitioning means, the former being expanded and returned to the column at a higher level and the latter led away as product, the effluent gas from said initial fractionation is liquefied and introduced after expansion into the top of the column as reflux, the second of the three portions of the gas to be separated is liquefied by heat interchange with the outgoing liquid product from the bottom of the column and then introduced after expansion at an intermediate level in the column, and the third portion of the gas to be separated is expanded through a turbine before admission to said column.

2. A process of separation of gases by low temperature rectification, wherein the cooled pressure-gas to be separated is divided into three portions, one of said portions and a cold portion at a lower pressure which has been previously partially fractionated in the upper portion of a fractionating column and thereby enriched in the constituent of higher liquefaction point are subjected to initial fractionation and further fractionation respectively alongside one another in the lower portion of the same column but are kept out of contact with one another by upstanding internal column-partitioning means, heat transfer taking place between the two through said partitioning means while they are undergoing said fractionations, the liquid enriched in the constituent of higher liquefaction point and the purified liquid fraction of the same constituent, obtained respectively as a result of said initial and further fractionations, collect in the bottom of the column at the same level on opposite sides of said upstanding partitioning means, the former being expanded and introduced into the upper portion of the column and the latter led away as product, the effluent gas from said initial fractionation is liquefied by indirect heat interchange with the partially liquefied substance in the upper portion of the column and introduced after expansion into the top of the column as reflux, the second of the three portions of the gas to be separated is liquefied by heat interchange with the outgoing liquid product from the bottom of the column and then introduced after expansion at an intermediate level in the upper portion of the column, and the third portion of the gas to be separated is expanded through a turbine before admission to the upper portion of said column.

3. A process of separation of gases by low temperature rectification wherein the pressure-gas mixture to be separated is initially cooled by being passed in two streams through two separate regenerative heat exchange systems and is then divided into three portions, one of said portions and a cold portion at a lower pressure which has been previously partially fractionated and enriched in the constituent of higher liquefaction point are subjected to initial fractionation and further fractionation respectively alongside one another in the same column but are kept out of contact with one another by upstanding internal column-partitioning means, heat transfer taking place between the two through said partitioning means while they are undergoing said fractionations, the liquid enriched in the constituent of higher liquefaction point and the purified liquid fraction of the same constituent, obtained respectively as a result of said initial and further fractionations, collect in the bottom of the column at the same level on opposite sides of said upstanding partitioning means, the former being expanded and returned to the column at a higher level and the latter led away as product, the effluent gas from said initial fractionation is liquefied and introduced after expansion into the top of the column as reflux, the second of the three portions of the gas to be separated is liquefied by heat interchange with the outgoing liquid product from the bottom of the column and then introduced after expansion at an intermediate level in the column, the third portion of the gas to be separated is expanded through a turbine before admission to said column, and one of said regenerative systems is cooled by outgoing gas product from the top of the column and the other by outgoing product from the bottom of the column after heat interchange between said latter product and said second of the three portions of the gas to be separated.

4. A process as claimed in claim 3, wherein the streams of ingoing gas mixture emerging from the cold ends of the two regenerative systems are combined and then divided to provide the first and second of the three portions of the gas mixture fed to the column, and the third portion is tapped off from one of the regenerative systems at a position intermediate its warm and cold ends.

5. A process as claimed in claim 3, wherein the ingoing gas passing through the regenerative system that is cooled by the outgoing product from the bottom of the column is compressed to a higher pressure than that passing through the regenerative system cooled by the gaseous product from the top of the column, the stream of ingoing gas emerging from the latter regenerative system constitutes the first of the three portions of the gas mixture fed to the column and that emerging from the former the second portion, and the third portion is tapped from the latter regenerative system at a position intermediate its warm and cold ends.

6. A process as claimed in claim 3, wherein the outgoing liquid product from the bottom of the column is passed through a restricting valve to reduce its pressure before it enters into the heat-interchange operation with the aforesaid second portion of the ingoing gas mixture.

7. A process as claimed in claim 6, wherein a booster is provided for assisting in drawing the product, which is passed through the aforesaid restricting valve, through the heat interchange and regenerative stages.

8. A process as claimed in claim 7, wherein the booster is driven at least in part by the aforesaid turbine.

9. A process as claimed in claim 3, wherein the liquid product from the bottom of the column is raised in pressure by a pump before being warmed and converted into gas in the heat interchange and regenerative stages, and is delivered as gas under pressure.

10. A process as claimed in claim 1, wherein the outgoing gaseous product from the top of the column is subjected to heat interchange with the effluent from said initial fractionations after the latter has been liquefied but before it is expanded for return to the column as reflux.

11. A process as claimed in claim 1, wherein the outgoing gaseous product from the top of the column is subjected to heat interchange with the aforesaid second portion of ingoing gas mixture after the latter has undergone heat inter-change with the product from the bottom of the column but before it is expanded for admission to the column.

12. A process as claimed in claim 1, wherein the ingoing cooled gas mixture is air, the outgoing liquid product from the bottom of the column is substantially pure oxygen, and the outgoing gaseous product from the top of the column is substantially pure nitrogen.

13. Apparatus for the separation of gases by low temperature rectification comprising a fractionating column having upper and lower portions, the lower portion being divided into two sections alongside one another by upstanding internal partitioning means through which heat transfer can take place between the sections, one of which sections is directly open at its upper end, for the purposes of gas and liquid flow, to the lower end of the upper portion of the column and the other being closed off from the remainder of the column interior, and the bottoms of said open and closed off sections of the lower portion of the column being situated at the same level so that liquids resulting from fractionation stages in said sections collect at said level on opposite sides of the upstanding partitioning means, a feed line for supplying a portion of the cooled pressure-gas mixture to be separated under pressure to the closed off section of the bottom portion of the column, a reflux line for conducting the effluent gas from the upper end of said closed off section to a reflux inlet at the top of the column, heat exchange means situated in the column near the lower end of the upper portion thereof and connected into said reflux line for liquefying said effluent, an expansion valve in the reflux line downstream of the heat exchange means, a further line for leading the liquid collecting at the bottom of the closed off section to a column entry at an intermediate level of the upper portion of the column, an expansion valve in said further line, an outlet line for gaseous product at the top of the column, a heat exchanger external to the column with separate flow passages for outgoing product from the bottom of the column and a second portion of the ingoing pressure-gas mixture to be separated whereby heat transfer can occur between them, an outlet line for outgoing liquid product leading from the bottom of the open section of the lower portion of the column to the external heat exchanger, a second feed line leading the second portion of the ingoing gas mixture from said external heat exchanger to a column entry at an intermediate level of the upper portion of the column, an expansion valve in said second feed line downstream of the heat exchanger, a third feed line for conducting a third portion of the ingoing pressure-gas mixture to an entry in the upper portion of the column, and a turbo-expander in said third feed line to bring about a lowering in the pressure and temperature of said third portion of gas mixture together with an output of useful work.

14. Apparatus for the separation of gases by low temperature rectification comprising two pairs of regenerators for cooling two streams of the ingoing pressure-gas mixture by means of the outgoing products, a fractionating column having upper and lower portions, the lower portion being divided into two sections alongside one another by upstanding internal partitioning means through which heat transfer can take place between the sections, one of which sections is directly open at its upper end, for the purposes of gas and liquid flow, to the lower end of the upper portion of the column and the other being closed off from the remainder of the column interior, and the bottoms of said open and closed off sections of the lower portion of the column being situated at the same level so that liquids resulting from fractionation stages in said sections collect at said level on opposite sides of the upstanding partitioning means, a feed line for supplying a portion of the cooled pressure-gas mixture from the regenerators to the closed off section of the bottom portion of the column, a reflux line for conducting the effluent gas from the upper end of said closed off section to a reflux inlet at the top of the column, heat exchange means connected into said reflux line for liquefying said effluent, an expansion valve in the reflux line downstream of the heat exchange means, a further line for leading the liquid collecting at the bottom of the closed off section to a column entry at an intermediate level of the upper portion of the column, an expansion valve in said further line, a heat exchanger external to the column with separate flow passages for the outgoing product from the bottom of the column and a second portion of the cooled pressure-gas mixture from the regenerators whereby heat transfer can occur between them, an outlet line for outgoing product leading from the bottom of the open section of the lower portion of the column to the external heat exchanger and thence to one of the regenerator pairs, an outlet line for leading gaseous product from the top of the column to the other regenerator pair, a second feed line leading the second portion of the ingoing gas mixture from said external heat exchanger to a column entry at an intermediate level of the upper portion of the column, an expansion valve in said second feed line downstream of the heat exchanger, a third feed line for conducting a third portion of the ingoing pressure-gas mixture to an entry in the upper portion of the column which third feed line leads from a tapping on one of the regenerator pairs intermediate the warm and cold ends thereof, and a turbo-expander in said third feed line to bring about a lowering in the pressure and temperature of said third portion of gas mixture together with an output of useful work.

15. Apparatus according to claim 14, and wherein the feed lines leading the aforesaid first and second portions of the ingoing pressure-gas mixture from the regenerators to the column have no connection with one another, the feed line for the first portion receiving the cooled gas mixture from the cold end of the regenerator pair cooled by the product from the top of the column and the feed line for the second portion receiving from the regenerator pair cooled by the product from the bottom of the column, so that the second portion can be pumped to a higher pressure than the first, and the feed line for the third portion of ingoing gas mixture leads from a tapping on the regenerator pair handling said first portion of the gas mixture.

16. Apparatus according to claim 13, and comprising a pump in the outlet line for the outgoing liquid product from the bottom of the column, and situated upstream of the heat exchanger, for compressing the product before it enters said heat exchanger.

17. Apparatus according to claim 14, and comprising an expansion valve in the outlet line for the outgoing product from the bottom of the column, said valve being situated upstream of the heat exchanger, a booster in the same outlet line to assist the passage of the expanded product through the heat exchanger and regenerator, and operative connections between said booster and the aforesaid turbine whereby the booster is driven at least in part by the turbine.

18. Apparatus according to claim 13, and comprising a heat exchanger wherein the effluent in the reflux line, after liquefaction in the heat exchange means in the column and before passing through its expanding valve, is further cooled by the outgoing gaseous product from the top of the column.

19. Apparatus according to claim 13, and comprising a heat exchanger wherein the aforesaid second portion of the ingoing gas mixture, after being cooled by the product from the bottom of the column and before passing through its expanding valve, is further cooled by the outgoing gaseous product from the top of the column.

20. Apparatus according to claim 13, and comprising three pairs of regenerators for separately cooling the three portions of ingoing gas mixture, the regenerator pair handling said second portion of gas mixture being cooled by outgoing product from the bottom of the column, and the two other regenerator pairs handling the first and third portions of the ingoing gas mixture being cooled by outgoing gaseous product from the top of the column.

21. A process of separation of gases by low temperature rectification, wherein the cooled pressure-gas to be separated is divided into three portions, one of said portions and a cold portion at a lower pressure which has been previously partially fractionated and enriched in the constituent of higher liquefaction point are subjected to initial fractionation and further fractionation respectively alongside one another in the lower portion of the same column but are kept out of contact with one another by upstanding internal column-partitioning means, heat transfer with substantially constant temperature difference at all levels taking place between the two through said partitioning means while they are undergoing said fractionations, the liquid enriched in the constituent of higher liquefaction point and the purified liquid fraction of the same constituent, obtained respectively as a result of said initial and further fractionations, collect in the bottom of the column at substantially the same level on opposite sides of said upstanding partitioning means, the effluent gas from said initial fractionation is liquefied by indirect heat interchange with the partially liquefied substance in the middle portion of the column above the aforesaid lower portion thereof, is then further cooled by heat interchange with the outgoing gaseous product from the top of the column and is thereafter expanded and introduced into the top of the column as reflux, the liquid enriched in the constituent of higher liquefaction point obtained at the bottom of the column as a result of said initial fractionation is expanded and returned to the column at a higher level, the purified liquid fraction obtained at the bottom of the column as a result of said further fractionation is led away as product, the second of the three portions of gas to be separated is liquefied by heat interchange with the outgoing liquid product from the bottom of the column, is then further cooled by heat interchange with the outgoing gaseous product from the top of the column and is thereafter expanded and introduced at a level in the column above the aforesaid middle portion of the column, and the third portion of the gas to be separated is expanded through a turbine before admission to the column.

22. A process of separation of gases by low temperature rectification, wherein the cooled pressure-gas to be separated is divided into three portions, one of said portions and a cold portion at a lower pressure which has been previously partially fractionated and enriched in the constituent of higher liquefaction point are subjected to initial fractionation and further fractionation respectively alongside one another in the lower portion of the same column but are kept out of contact with one another by upstanding internal column-partitioning means, heat transfer with substantially constant temperature difference at all levels taking place between the two through said partitioning means while they are undergoing said fractionations, the liquid enriched in the constituent of higher liquefaction point and the purified liquid fraction of the same constituent, obtained respectively as a result of said initial and further fractionations, collect in the bottom of the column at substantially the same level on opposite sides of said upstanding partitioning means, the effluent gas from said initial fractionation is liquefied by indirect heat interchange with the partially liquefied substance in the middle portion of the column above the aforesaid lower portion thereof, is then further cooled by heat interchange with the outgoing gaseous product from the top of the column and is thereafter expanded and introduced into the top of the column as reflux, the liquid enriched in the constituent of higher liquefaction point obtained at the bottom of the column as a result of said initial fractionation is expanded and returned to the column at a higher level, the purified liquid fraction obtained at the bottom of the column as a result of said further fractionation is led away as product, the second of the three portions of the gas to be separated is liquefied by heat interchange in a co-current condenser with the outgoing liquid product from the bottom of the column, is then further cooled by heat interchange with the outgoing gaseous product from the top of the column and is thereafter expanded and introduced at an intermediate level in the upper portion of the column above the aforesaid middle portion thereof, and the third portion of the gas to be separated is expanded through a turbine before admission to the upper portion of the column at a level below the point of admission of said second portion.

23. A process of separation of gases by low temperature rectification, wherein the cooled pressure-gas to be separated is divided into three portions, one of said portions and a cold portion at a lower pressure which has been previously partially fractionated and enriched in the constituent of higher liquefaction point are subjected to initial fractionation and further fractionation respectively alongside one another in the lower portion of the same column but are kept out of contact with one another by upstanding internal column-partitioning means, heat transfer with substantially constant temperature difference at all levels taking place between the two through said partitioning means while they are undergoing said fractionations, the liquid enriched in the constituent of higher liquefaction point and the purified liquid fraction of the same constituent, obtained respectively as a result of said initial and further fractionations, collect in the bottom of the column at substantially the same level on opposite sides of said upstanding partitioning means, the effluent gas from said initial fractionation is liquefied by indirect heat interchange with the partially liquefied substance in the middle portion of the column above the aforesaid lower portion thereof, is then further cooled by heat interchange with the outgoing gaseous product from the top of the column and is thereafter expanded and introduced into the top of the column as reflux, the liquid enriched in the constituent of higher liquefaction point obtained at the bottom of the column as a result of said initial fractionation is expanded and returned to the column at a higher level, the purified liquid fraction obtained at the bottom of the column as a result of said further fractionation constitutes the liquid product and is expanded and thereafter evaporated in a co-current condenser, the flow in the product line being boosted downstream of said condenser after being warmed to substantially ambient temperature to assist the passage of the expanded product through it, the second of the three portions of the gas to be separated is liquefied by heat interchange in said co-current condenser with the outgoing liquid product from the bottom of the column, is then further cooled by heat interchange with the outgoing gaseous product from the top of the column and is thereafter expanded and introduced at an intermediate level in the upper portion of the column above the aforesaid middle portion thereof, and the third portion of the gas to be separated is expanded through a turbine before admission to the upper portion of the column at a level below the point of admission of said second portion.

References Cited in the file of this patent

UNITED STATES PATENTS

| | | |
|---|---|---|
| 1,959,883 | Van Nuys | May 22, 1934 |
| 2,000,992 | Schlitt | May 14, 1935 |
| 2,209,748 | Schlitt | July 30, 1940 |
| 2,423,274 | Van Nuys | July 1, 1947 |
| 2,503,939 | De Baufre | Apr. 11, 1950 |
| 2,619,810 | Rice | Dec. 2, 1952 |
| 2,655,796 | Rice | Oct. 20, 1953 |
| 2,664,719 | Rice | Jan. 5, 1954 |
| 2,671,324 | Trumpler | Mar. 9, 1954 |
| 2,715,316 | Paget | Aug. 16, 1955 |

FOREIGN PATENTS

| | | |
|---|---|---|
| 169.564 | Germany | 1906 |